United States Patent
Park et al.

(10) Patent No.: US 8,436,818 B2
(45) Date of Patent: May 7, 2013

(54) MOBILE TERMINAL HAVING TOUCH SCREEN AND METHOD FOR DISPLAYING CURSOR THEREOF

(75) Inventors: Jin Woo Park, Gumi-si (KR); Won Joo Ji, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 800 days.

(21) Appl. No.: 12/506,795

(22) Filed: Jul. 21, 2009

(65) Prior Publication Data

US 2010/0020043 A1    Jan. 28, 2010

(30) Foreign Application Priority Data

Jul. 28, 2008  (KR) .................. 10-2008-0073653

(51) Int. Cl.
   *G06F 3/041*    (2006.01)
(52) U.S. Cl.
   USPC ........ 345/173; 345/174; 345/157; 178/18.06; 715/856

(58) Field of Classification Search .................. 345/156, 345/173–183, 157; 178/18.05–18.07; 715/856
See application file for complete search history.

(56) References Cited

U.S. PATENT DOCUMENTS

2008/0012835 A1*  1/2008  Rimon et al. ................. 345/173

* cited by examiner

*Primary Examiner* — Lun-Yi Lao
*Assistant Examiner* — Insa Sadio
(74) *Attorney, Agent, or Firm* — Jefferson IP Law, LLP

(57) ABSTRACT

A portable terminal including a touch screen and method for displaying a cursor thereof are provided. The method includes determining whether a capacitance is equal to or greater than a first critical value and is less than a second critical value, if the change of the capacitance is sensed in the touch screen, displaying a cursor in an area where the change of the capacitance is sensed, if the capacitance is equal to or greater than the first critical value and is less than the second critical value, and performing a function corresponding to the area where the cursor is displayed, if the capacitance sensed in the area where the cursor is displayed is equal to or greater than the second critical value.

16 Claims, 5 Drawing Sheets

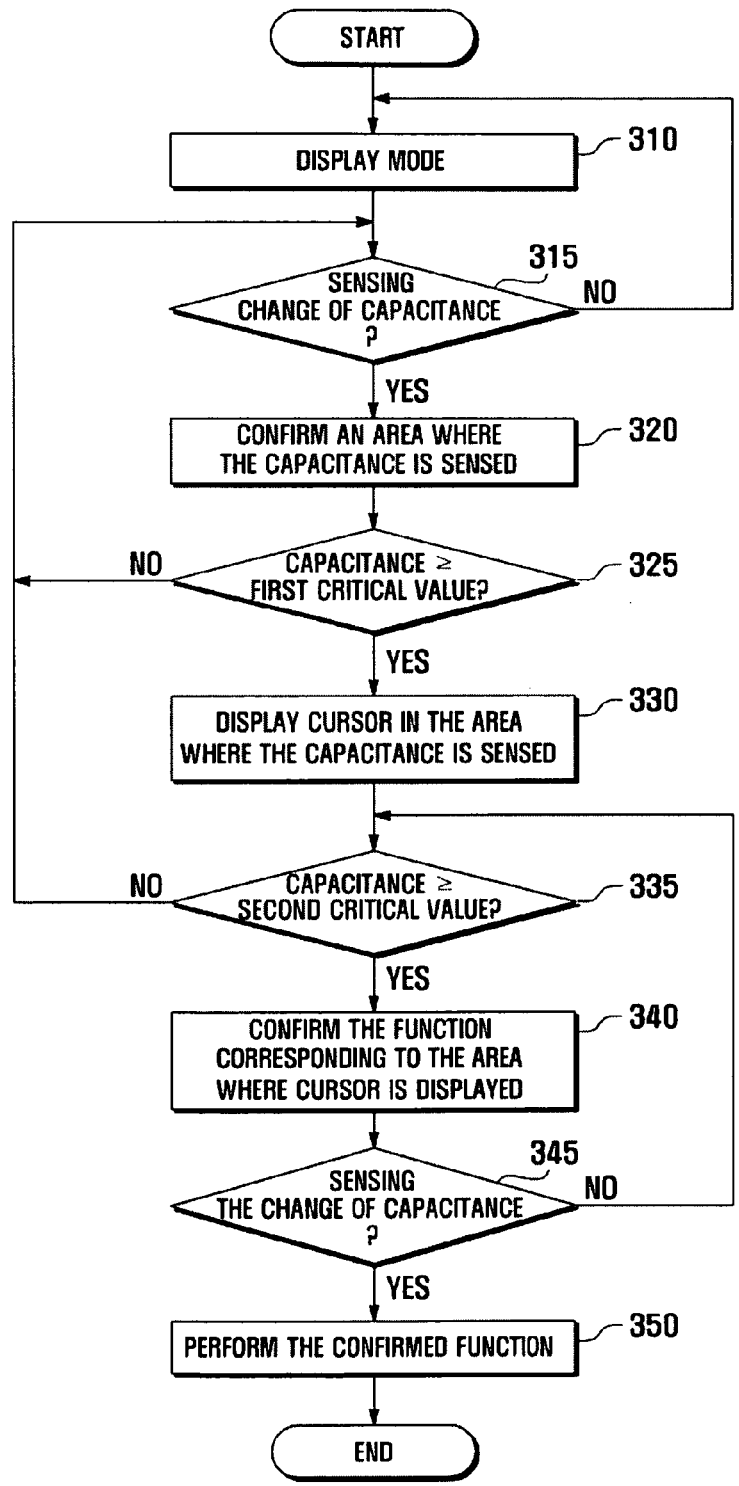

MOBILE TERMINAL HAVING TOUCH SCREEN AND METHOD FOR DISPLAYING CURSOR THEREOF

PRIORITY

This application claims the benefit under 35 U.S.C. §119 (a) of a Korean patent application filed in the Korean Intellectual Property Office on Jul. 28, 2008 and assigned Serial No. 10-2008-0073653, the entire disclosure of which is hereby incorporated by reference.

BACKGROUND OF THE INVENTION

1. Field of the Invention

The present invention relates to a portable terminal including a touch screen and a method for displaying a cursor thereof. More particularly, the present invention relates to a portable terminal having a capacitive overlay type touch screen and a method for displaying a cursor according to a touch sensed in the portable terminal.

2. Description of the Related Art

A touch screen has an advantage in that an input unit and a display unit can be implemented through one apparatus, and the touch screen can be mounted on a small terminal, such as a portable terminal. Touch screens mounted on the portable terminal include a capacitive overlay type, a resistive overlay type, a surface acoustic wave type, a transmitter type and an infrared beam type. Among the various types of touch screens, the capacitive overlay type touch screen is commonly used for portable terminals.

The capacitive overlay type touch screen can detect an area where touch occurs through the change of capacitance which is generated when an object that is conductive, such as the body of a user or a stylus including a dielectric substance, comes into contact with the touch screen. The change of capacitance is in proportion to dimensions of the object that contacts the touch screen. Therefore, as the dimensions of the object which is sensed in the touch screen is increased, the area where the touch is sensed can be more accurately.

However, since the size of the touch screen is limited, a small terminal, such as the portable terminal, has a problem in that a user can misrecognize the area touched by the object in the capacitive overlay type touch screen as another area. Accordingly the portable terminal displays an undesired icon or location or the portable terminal malfunctions.

Therefore, a need exists for a portable terminal and a method for accurately determining an area touched on a capacitive overlay type touch screen of the portable terminal.

SUMMARY OF THE INVENTION

An aspect of the present invention is to address at least the above-mentioned problems and/or disadvantages and to provide at least the advantages described below. Accordingly, an aspect of the present invention is to provide a portable terminal including a capacitive overlay type touch screen and a method for displaying a cursor in the portable terminal.

In accordance with an aspect of the present invention, a method for displaying a cursor of a portable terminal including a capacitive overlay type touch screen is provided. The method includes determining whether a capacitance is equal to or greater than a first critical value and is less than a second critical value, if the change of the capacitance is sensed in the touch screen, displaying a cursor in an area where the change of the capacitance is sensed, if the capacitance is equal to or greater than the first critical value, and is less than the second critical value, and performing a function corresponding to the area where the cursor is displayed, if the capacitance sensed in the area where the cursor is displayed is equal to or greater than the second critical value.

In accordance with another aspect of the present invention, a portable terminal is provided. The portable terminal includes a touch screen including a touch sensor for sensing a change of capacitance, a display unit for displaying a cursor corresponding to the sensed capacitance, a storage for storing a first critical value and a second critical value for displaying the cursor corresponding to the capacitance, and a controller for determining whether the capacitance is equal to or greater than the first critical value and is less than the second critical value if the change of the capacitance is sensed in the touch screen, for controlling the touch screen to display the cursor in an area where the change of the capacitance is sensed if the capacitance is equal to or greater than the first critical value and is less than the second critical value, for determining whether the capacitance sensed in the area where the cursor is displayed is equal to or greater than the second critical value stored in the storage, and for performing a function corresponding to the area where the cursor is displayed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 3 is a flowchart illustrating a method for displaying a cursor according to an exemplary embodiment of the present invention.

Throughout the drawings, it should be noted that like reference numbers are used to depict the same or similar elements, features and structures

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
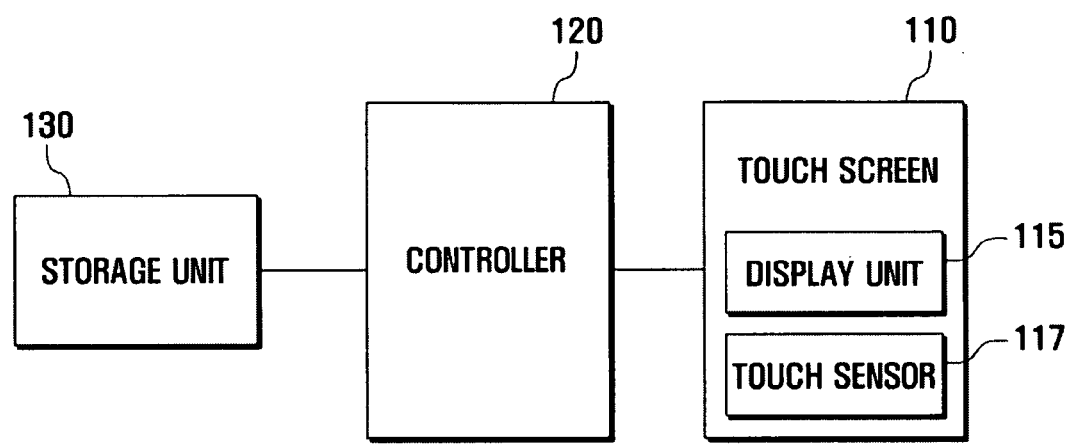
FIG. 1 is a block diagram illustrating a schematic configuration of a portable terminal according to an exemplary embodiment of the present invention.
Figure 2A:
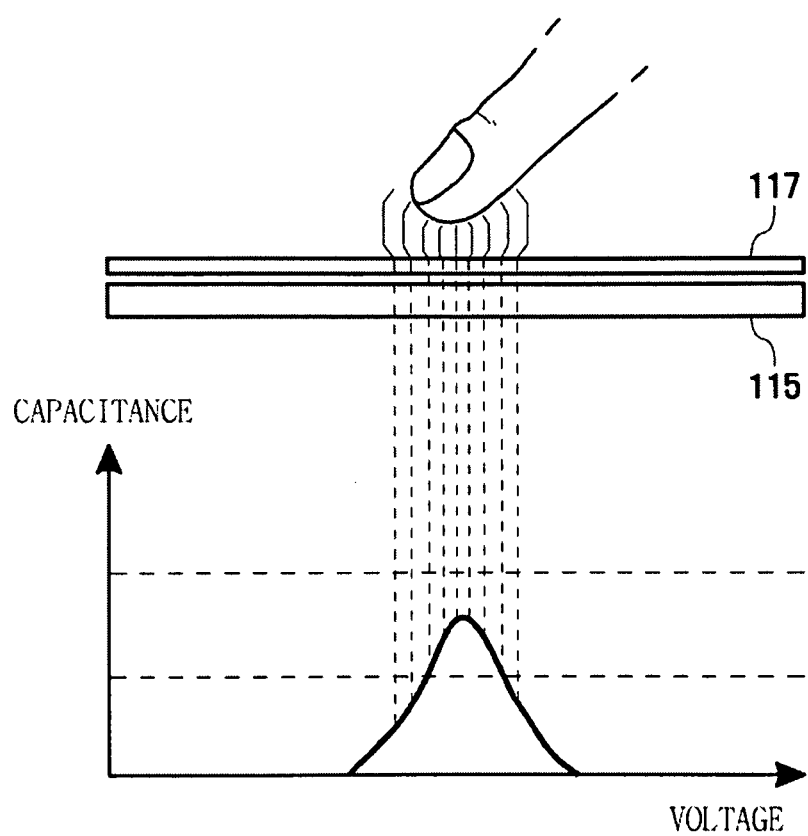
FIGS. 2A and 2B are graphs illustrating a change of capacitance of a touch screen according to an exemplary embodiment of the present invention.
Figure 2B:
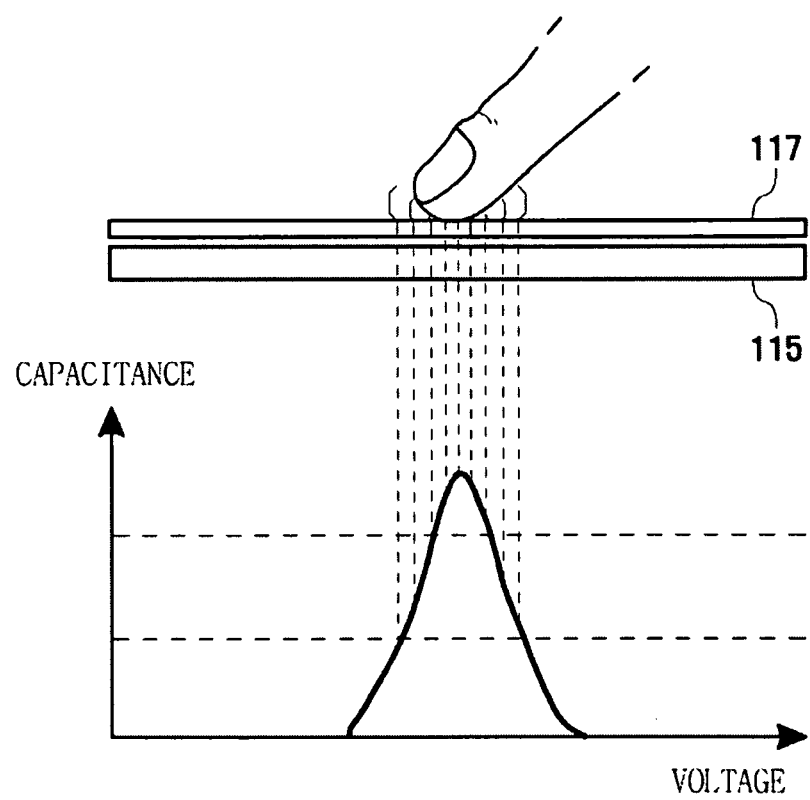

FIG. 1 is a block diagram illustrating a schematic configuration of a portable terminal according to an exemplary embodiment of the present invention. FIGS. 2A and 2B are graphs illustrating a change of capacitance of a touch screen according to an exemplary embodiment of the present invention.

Referring to FIG. 1, the portable terminal includes a touch screen 110, a controller 120 and a storage unit 130. The touch screen 110 includes a display unit 115 and a touch sensor 117. The display unit 115 may display various data related to a state and an operation of the portable terminal. More particularly, if the display unit 115, under control of the controller 120, senses access to the touch screen 110 by an object, a cursor may be displayed in an area accessed where the object is sensed.

Accordingly, the user may confirm the area selected through the cursor displayed on the display unit 115. Here, the cursor may be displayed with a type of highlight or a type of block. According to a change of capacitance which is sensed in the given area of the touch screen 110 under the control of the controller 120, the display unit 115 may display the cursor as a dark or light color or the size of the cursor as large or small.

The touch sensor 117 may be mounted on the display unit 115. The display unit 115 may sense the touch generated by the access by the object or contact and canceled contact by the object. The touch sensor 117 determines a coordinate of the area in which the access by the object or contact and canceled contact by the object is sensed, and transmits the detected coordinate to the controller 120. Here, the touch sensor 117 may sense the capacitance which changes according to the access by the object or contact and canceled contact by the object sensed on the touch screen 110.

The touch screen 110 using the touch sensor 117 may recognize the area in which the touch is sensed through the change of the capacitance which is generated when the object having conductivity, such as the finger of the user, contacts the touch screen 110 coated with a conductive material. As a result, the value of the capacitance increases as the object having conductivity approaches the touch screen 110 and as the area contacted on the touch screen 110 has widened.

Referring to FIGS. 2A and 2B, if an object, such as the finger of the user, approaches the touch screen 110, the capacitance gradually begins to increase as illustrated in the graph in FIG. 2A. If the object contacts the touch screen 110, the capacitance has a maximum value as illustrated in the graph in FIG. 2B. The touch sensor 117 mounted on the capacitive overlay type touch screen 110 may transmit information corresponding to the capacitance, which changes according to the access by the object or contact and canceled contact by the object, to the controller 120 to confirm the area in which the access by the object or contact and canceled contact by the object is sensed.

The controller 120 controls the state and the operation of the overall configurations of the portable terminal. More particularly, the controller 120 determines whether the information corresponding to the capacitance received from the touch screen 110 is included in a critical value stored in the storage unit 130, and may confirm the area in which the access by the object or contact and canceled contact by the object is sensed.

A peak compare method and a frequency conversion method may be used for the controller 120 to determine an area in which the access by the object or contact and canceled contact by the object is sensed according to the change of capacitance. In the peak compare method, the peak, which is a maximum demand voltage, reduces when the capacitance increases due to the contact by the object having conductivity, such as the finger of the user or a stylus, on the touch screen 110. In the frequency conversion method, the frequency is decreased when the capacitance increases due to the contact by the object having conductivity on the touch screen 110.

In other words, the controller 120 confirms the peak or the frequency which changes according to the capacitance, and may sense the access by the object or contact and canceled contact by the object on the touch screen 110. Moreover, the controller 120 may determine the area in which the access by the object or contact and canceled contact by the object is sensed through the peak or the frequency which changes according to the capacitance. In an exemplary implementation, by using the change of the capacitance, the controller 120 may display the cursor in the area in which the access by the object or contact and canceled contact by the object is sensed.

More specifically, the controller 120 may display the cursor in the area in which the capacitance is confirmed by comparing the confirmed capacitance and the critical value stored in the storage unit 130. At this time, the critical value stored in the storage 130 may be classified into a plurality of critical values, for example, a first critical value and a second critical value. The first critical value is a reference value which displays the cursor in the area where the access by the object is sensed on the touch screen 110, and the second critical value is a reference value which confirms the contact by the object with the touch screen 110.

Thus, the controller 120 may display the cursor in the area in which the capacitance is confirmed. That is, the controller 120 may display the cursor in the area accessed in which the object is sensed on the touch screen 110 when the confirmed capacitance is equal to or greater than the first critical value, and is less than the second critical value. The controller 120 confirms the capacitance in the area in which the cursor is displayed and determines whether the confirmed capacitance is equal to or greater than the second critical value. If the capacitance is equal to or greater than the second critical value, the controller 120 may perform a function mapped in the area in which the cursor is displayed. At this time, the first critical value and the second critical value may be set by a manufacturer of the portable terminal or may be set by the user.

In an exemplary implementation, the first critical value and the second critical value, as described in an exemplary embodiment of the present invention, are set by the user. If the user selects a setup mode through a menu or a function key to set the first critical value and the second critical value, the controller 120 displays a screen which indicates a cursor setup mode on the touch screen 110. At this time, the controller 120 displays a first sensing window which may set the first critical value and a second sensing window which may set the second critical value.

The controller 120 confirms the capacitance which changed according to the access by the object to the first sensing window, and displays the cursor in the area in which the change of the capacitance is sensed. The controller 120 confirms the capacitance which changes according to the access of by the object. Here, if the access by the object is sensed in the first sensing window, the controller 120 displays the cursor in the area in which the access by the object is sensed in the first sensing window. The controller 120 may display a message, such as 'move finger or stylus near touch screen 110' on the display unit 115 with a pop up message or an overlay type message. Accordingly, the user may recognize that an object, such as the finger or the stylus, should not have contact with the first sensing window displayed on the touch screen 110.

The controller 120 then confirms whether the contact by the object is sensed in the second sensing window and confirms the capacitance changed according to the contact by the confirmed object. In this case, the controller 120 may display a message, such as 'contact finger or stylus to touch screen 110' on the display unit 115 with the pop up message or the overlay type message. Based on the message displayed, the user may recognize that the object has to have contact with the second sensing window displayed on the touch screen 110.

If the capacitance is confirmed, the controller 120 determines whether the storing of a value corresponding to the capacitance is selected through the touch screen 110. If the storing of the capacitance value is selected, the controller 120 may store the capacitance value confirmed in the first sensing window and the second sensing window in the storage unit 130 with the first critical value and the second critical value. Here, a method implemented by the controller 120 determines whether an object has contact with the touch screen 110 is described below.

An assumption is made herein that a maximum capacitance which may be confirmed in the capacitive overlay type touch screen 110 is preset in the storage unit 130. The controller 120 confirms the capacitance which is generated when the object has contact with the touch screen 110. The controller 120 determines whether the confirmed capacitance has a value which is close to the preset capacitance. If the confirmed capacitance has a value which is close to the preset capacitance, the controller 120 may determine that the object has contact with the touch screen 110. The storage unit 130 stores various applications which are necessary when the portable terminal performs functions and various data which is generated while functions are performed in the portable terminal. More particularly, the storage unit 130 stores the first critical value and the second critical value which is set to sense the contact by the object in the capacitive overlay type touch screen 110. Here, the first critical value is a reference value for displaying the cursor in the area in which the access by the object is sensed, and the second critical value is a reference value for confirming the contact by the object in the touch screen 110.

Although not illustrated in the drawings, the portable terminal may further include various configurations according to the functions which may be performed in the portable terminal, such as a communications unit which performs a communication function between the portable terminal and a base station, a camera unit which takes a picture of images, a Digital Multimedia Broadcasting (DMB) receiver which receives a digital broadcasting signal, an internet receiver which performs an internet function by communicating with an internet network, and the like. In an exemplary implementation, if the access by the object is sensed through the touch screen 110 of the portable terminal, the controller 120 determines whether the capacitance changing according to the access by the object is equal to or greater than the first critical value, and is less than the second critical value.

If the changed capacitance is equal to or greater than the first critical value, and is less than the second critical value, the controller 120 displays the cursor in the area in which the access by the object is sensed by controlling the touch screen 110. Moreover, if the contact by the object is sensed, the controller 120 determines whether the capacitance which changes according to the contact by the object is equal to or greater than the second critical value. If the changed capacitance is equal to or greater than the second critical value, the controller 120 confirms the function mapped in the area in which the contact by the object is sensed and may perform the confirmed function. The method implemented by the controller 120 for displaying the cursor according to the access by the object, contact and canceled contact by the object is illustrated with reference to FIG. 3.

Figure 4:
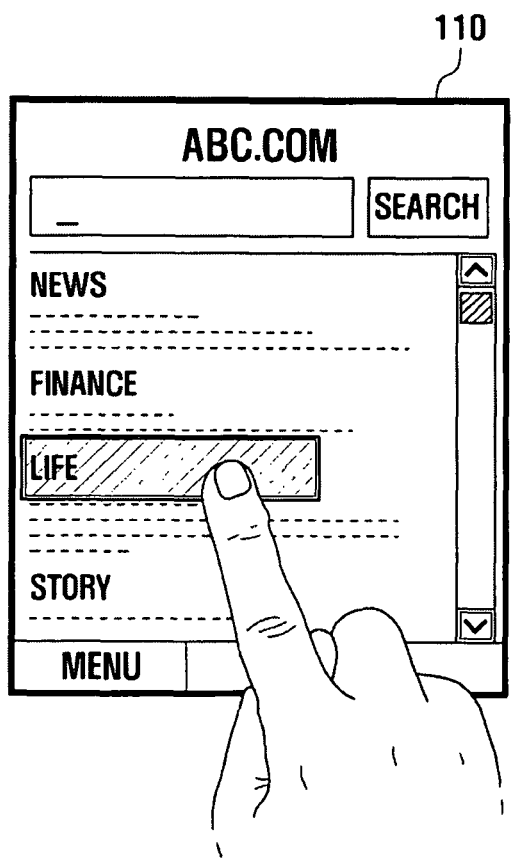
FIG. 4 is an exemplary view of a screen displaying a cursor on a touch screen according to an exemplary embodiment the present invention.

FIG. 3 is a flowchart illustrating a method for displaying a cursor according to an exemplary embodiment of the present invention. FIG. 4 is an exemplary view of a screen displaying a cursor on a touch screen according to an exemplary embodiment of the present invention.

Referring to FIG. 3, the controller 120 displays a screen corresponding to a mode performed in the portable terminal on the touch screen 110 in step 310. Here, the mode operated in the portable terminal denotes all modes that may be operated in the portable terminal, such as a standby mode, a game mode, a short message writing mode, and the like. The controller 120 then determines whether a change of capacitance is sensed through the touch screen 110 in step 315.

For example, the controller 120 determines whether access by an object of a user for selecting a given area on the touch screen 110 is sensed. If the object approaches the touch screen 110, the controller 120 senses the capacitance which changes according to the access by the object through the touch screen 110. The controller 120 then confirms the changed capacitance and the area in which the change of the capacitance is sensed in the touch screen 110 in step 320. The controller 120 compares the confirmed capacitance with a first critical value stored in the storage unit 130, and determines whether the confirmed capacitance is equal to or greater than the first critical value in step 325.

At this time, the controller 120 may confirm whether the confirmed capacitance is equal to or greater than the first critical value, as well as whether the confirmed capacity is less than a second critical value. If the confirmed capacitance is equal to or greater than the second critical value, the controller 120 may determine the contact by the object, since the second critical value is set to sense the contact by the object.

Accordingly, the controller 120 may determine that the confirmed capacitance is equal to or greater than the first critical value and less than the second critical value. If the confirmed capacitance is less than the set first critical value, the controller 120 returns to step 315 and determines whether the change of the capacitance is sensed. If the confirmed capacity is equal to or greater than the set first critical value, the controller 120, as illustrated in FIG. 4, displays the cursor in the area in which the capacitance is sensed in step 330.

More specifically, an assumption is made herein that the first critical value is stored with 5 µF, and the second critical value is stored with 9 µF. If the object approaches the touch screen 110, the controller 120 confirms the change of the capacitance through the touch screen 110. If the changed capacitance is 6 µF, the confirmed capacitance is 5 µF or greater than 5 µF, which is the set first critical value, and less than 8 µF, which is the second critical value, so that the controller 120, as illustrated in FIG. 4, may display the cursor in the area in which the change of the capacitance is sensed. For example, an assumption is made herein that the touch screen 110, as illustrated in FIG. 4, displays a website in an internet mode under the control of the controller 120. If the user moves the object, such as the finger of the user or the stylus, close to the touch screen 110 to select contents in the website which are displayed, the controller 120 senses the change of capacitance due to the access by the object and confirms the area in which the capacitance is sensed.

The controller 120 confirms the changed capacitance, and determines whether the confirmed capacitance is equal to or greater than the first critical value, and is less than the second critical value. If the confirmed capacitance is equal to or greater than the first critical value, and is less than the second critical value, the controller 120 may display a block type cursor in the area in which the change of the capacitance is sensed. In other words, as illustrated in FIG. 4, in the touch screen 110, the block type cursor may be displayed in the area to which the finger of the user is approaching.

In an exemplary implementation, the controller 120 displays the block type cursor in the area in which the change of the capacitance is sensed. However, the present invention is not limited thereto. The area in which the change of the capacitance is sensed may be displayed with a highlight. The controller 120 may enlarge and display the content (for example, a character, an image, an icon, and the like) displayed in the area in which the change of the capacitance is sensed. Accordingly, when the object, such as the finger of the user, approaches the touch screen 110 and the object moves, the controller 120 may enlarge and display the content displayed in the area in which the change of the capacitance is sensed according to the movement of the object.

Moreover, the controller 120 displays a colored cursor displayed in the area in which the change of the capacitance is sensed according to a variation of the capacitance to be darker or lighter than the original color of the contents displayed on the touch screen 110. For example, if the capacitance sensed through the touch screen 110 is 1 µF, the controller 120 displays the color of the cursor displayed in the area in which the change of the capacitance is sensed. If the sensed capacitance is increased, the controller 120 may display the color of the cursor displayed in the area in which the change of the capacitance is sensed. Then, if the sensed capacitance is decreased, the controller 120 may display the color of the cursor displayed in the area in which the change of the capacitance is sensed to be light according to the reduced capacitance.

Otherwise, the controller 120 may enlarge or reduce to display together the cursor displayed in the area in which the change of the capacitance is sensed according to the variation of the capacitance and the content displayed in the area in which the change of the capacitance is sensed. For example, if the sensed capacitance is 1 µF, the controller 120 may display the cursor and content displayed in the area in which the change of the capacitance is sensed, with the originally displayed size. Also, if the sensed capacitance is increased, the controller 120 may display the cursor and content displayed in the area in which the change of the capacitance is sensed to be greater than the originally displayed size according to the increased capacitance. Then, if the sensed capacitance is decreased, the controller 120 may display the cursor and content displayed in the area in which the change of the capacitance is sensed with the originally displayed size according to the decreased capacitance.

Accordingly, by displaying the color and size of the cursor differently according to the variation of the capacitance, the user may recognize the distance from which the object, such as, the finger of the user or the stylus, approaches the touch screen 110. The controller 120 displaying the cursor in the area in which the changed capacitance is sensed according to the access by the object determines whether the capacitance sensed in the area in which the cursor is displayed is equal to or greater than the second critical value in step 335.

In other words, if the object, such as the finger of the user or the stylus, has contact with the touch screen 110 to select the area in which the cursor is displayed, the controller 120 confirms the capacitance changed from the contact by the object through the touch screen 110. The controller 120 compares the confirmed capacitance with the second critical value stored in the storage unit 130 and determines whether the confirmed capacitance is equal to or greater than the second critical value. For example, if the second critical value is set to 15 µF, the controller 120 determines whether the value of the capacitance sensed in the area in which the cursor is displayed through the touch screen 110 is 15 µF or greater than 15 µF. If the capacitance is equal to or greater than the second critical value, the controller 120 confirms the function corresponding to the area in which the cursor is displayed in step 340.

If the capacitance is confirmed to be equal to or greater than the second critical value, the object, such as the finger of the user or the stylus, has contact with a select area of the touch screen 110. Accordingly, if the capacitance is equal to or greater than the second critical value, the controller 120 confirms the function mapped in the area in which the change of the capacitance is sensed. That is, the controller 120 confirms the function mapped in the area in which the cursor is displayed. On the other hand, if the capacitance is not equal to or greater than the second critical value, the controller 120 performs step 315 again. The controller 120 confirming the function corresponding to the area in which the cursor is displayed determines whether the contact is canceled in step 345.

In the method for determining whether the contact is canceled, the controller 120 compares the capacitance with the first critical value and may determine that the contact is canceled when the capacitance is less than the first critical value. Moreover, the controller 120 may determine that the object that has contact with the touch screen 110 is released as the capacitance draws near 0µF. If the contact is not canceled, the controller 120 returns to step 335. However, if the contact is canceled, the controller 120 performs the function corresponding to the area in which the cursor is displayed in step 350.

Here, the function which may be performed includes all the functions which may be performed in all modes of the portable terminal. For example, if the mode of the portable terminal includes a menu selection mode, the selected menu may be displayed. If the mode of the portable terminal is a Moving Picture Expert Group Layer-3 (MP3) play mode, a selected MP3 file may be played. Also, if the mode of the portable terminal is a short message writing mode, the controller 120 may display a character corresponding to the area in which the cursor is displayed on the touch screen 110. Further, if the mode of the portable terminal is an internet mode, the controller 120 connects to the website corresponding to the content corresponding to the area in which the cursor is displayed and may display the connected website on the touch screen 110.

In an exemplary implementation, if the access by the object, such as the finger of the user, is sensed in the touch screen 110 which is included in the portable terminal, the controller 120 confirms the capacitance which changes according to the access by the object, and may display the cursor in the area in which the change of the capacitance is sensed according to the confirmed capacitance. Based on the cursor which is displayed, the user may confirm the area touched on the touch screen 110.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for displaying a cursor of a portable terminal comprising a capacitive overlay type touch screen, the method comprising:
    detecting one of access by an object on a touch screen and contact by the object with the touch screen;
    determining whether a value of change of capacitance is one of equal to a first threshold and greater than the first threshold, and is less than a second threshold;
    displaying a cursor in an area where the change of the capacitance is detected, if the value of the change of capacitance is one of equal to the first threshold and greater than the first threshold, and is less than the second threshold; and
    performing a function corresponding to the area where the cursor is displayed, if the value of the change of capacitance detected in the area where the cursor is displayed is one of equal to the second threshold and greater than the second threshold.

2. The method of claim 1, wherein the first threshold comprises a reference value for displaying the cursor in the area where the access of the object is detected on the touch screen.

3. The method of claim 1, wherein the second threshold comprises a reference value for confirming the contact of the object with the touch screen.

4. The method of claim 1, wherein the displaying of the cursor comprises displaying a block type cursor in the area where the change of the capacitance is detected.

5. The method of claim 4, wherein the displaying of the cursor comprises displaying a colored cursor, if the value of the chanage of capacitance increases or decreases.

6. The method of claim 5, wherein the displaying of the colored cursor comprises displaying a dark color cursor or a light color cursor corresponding to the increase or the decrease of the value of change of capacitance.

7. The method of claim 4, wherein the displaying of the cursor comprises displaying a changed size of the cursor, if the value of the change of capacitance increases or decreases.

8. The method of claim 7, wherein the displaying of the changed size of the cursor comprises displaying a larger size cursor than an original size cursor or a smaller size cursor than the original size cursor corresponding to the increase or the decrease of the value of the change of capacitance.

9. A portable terminal comprising:
    a touch screen comprising a touch sensor for detecting one of access by an object on a touch screen and contact by the object with the touch screen, and for displaying a cursor corresponding to a value of the change of capacitance;
    a storage unit for storing a first threshold and a second threshold for displaying the cursor corresponding to the value of the change of capacitance; and
    a controller for determining, when the change of the capacitance is detected through the touch sensor, whether the value of the change of capacitance is one of equal to the first threshold and greater than the first threshold, and is less than the second threshold, for controlling the touch screen to display the cursor in an area where the change of the capacitance is detected if the capacitance is one of equal to the first threshold and greater than the first threshold, and is less than the second threshold, and for performing a function corresponding to the area where the cursor is displayed, if the value of the change of capacitance detected in the area where the cursor is displayed is one of equal to the second threshold and greater than the second threshold.

10. The portable terminal of claim 9, wherein the first threshold comprises a reference value for displaying the cursor in the area where the access of the object is detected on the touch screen.

11. The portable terminal of claim 9, wherein the second threshold comprises a reference value for confirming the contact of the object with the touch screen.

12. The portable terminal of claim 9, wherein the controller controls the touch screen to display a block type cursor in the area where the change of the capacitance is detected.

13. The portable terminal of claim 12, wherein the controller controls the touch screen to display a colored cursor, if the value of the change of capacitance increases or decreases.

14. The portable terminal of claim 13, wherein the controller controls the touch screen to display a dark color cursor or a light color cursor corresponding to the increase or the decrease of the value of the change of capacitance.

15. The portable terminal of claim 12, wherein the controller controls the touch screen to display a changed size of the cursor, if the value of the change of capacitance increases or decreases.

16. The portable terminal of claim 15, wherein the controller controls the touch screen to display a larger size cursor than an original size cursor or a smaller size cursor than the original size cursor corresponding to the increase or the decrease of the value of the change of capacitance.

* * * * *